March 3, 1953 J. W. SMITH 2,630,494

AUTOMATIC PHASING CIRCUIT FOR FACSIMILE CIRCUITS

Filed Oct. 22, 1949

INVENTOR.
JOHN W. SMITH

BY Carl V. Olson

ATTORNEY

Patented Mar. 3, 1953 2,630,494

UNITED STATES PATENT OFFICE 2,630,494

AUTOMATIC PHASING CIRCUIT FOR FACSIMILE CIRCUITS

John W. Smith, Whitestone, N. Y., assignor to Faximile, Inc., New York, N. Y., a corporation of Delaware Application October 22, 1949, Serial No. 122,928

4 Claims. (Cl. 178—69.5)

This invention relates to facsimile systems and more particularly to facsimile recorders having automatic means for phasing responsively to a standard facsimile signal.

A most successful facsimile system for the transmission of graphic material by radio or wire includes a recorder wherein a strip of electrolytic paper is continuously passed between linear and helical electrodes having a point of intersection which moves in one direction across the paper to trace succeeding lines thereon. The fluctuating current flowing through the paper point-by-point and line-by-line reproduces the graphic material scanned at sending end of the system. In radio facsimile it is standard to transmit an interpage signal after each page of graphic material. The interpage signal appears at the receiver as a black bar across the recording paper and may include a limited amount of station identification printing or other indicia in reverse. The interpage signal provides a number of consecutive lines of full-black signal for phasing purposes at the recorder, i. e., to insure that the recorded material will be centered on the recording sheet.

In the operation of facsimile systems of the type under discussion, there are occasions when bursts of noise or interference are sufficiently strong to energize the phasing circuit and cause the recording to appear displaced from the center of the recording sheet. When this occurs, the recording remains out of frame until the next interpage signal is received. It is therefore the general object of this invention to provide an automatic phasing apparatus which is sensitive solely during receipt of an interpage signal, or comparable solid black signal, and which is immune to disturbances occurring at other times.

Pursuant to these and other objects which will be apparent to those skilled in the art, a portion of the received facsimile signal is applied to the control electrode of a thyratron having an A.-C. plate voltage supply to insure quenching of the tube in the absence of solid black signal. The expression "solid black facsimile signal," as used herein, means a signal operative to record a number of consecutive black lines, or if negative recordings are made, a number of consecutive white lines. Means responsive to the output of the thyratron renders the recorder framing circuit operative solely when the thyratron is conductive.

For a more detailed explanation of the invention reference is had to the following description taken in conjunction with the appended drawings wherein.

Figures 1, 2:
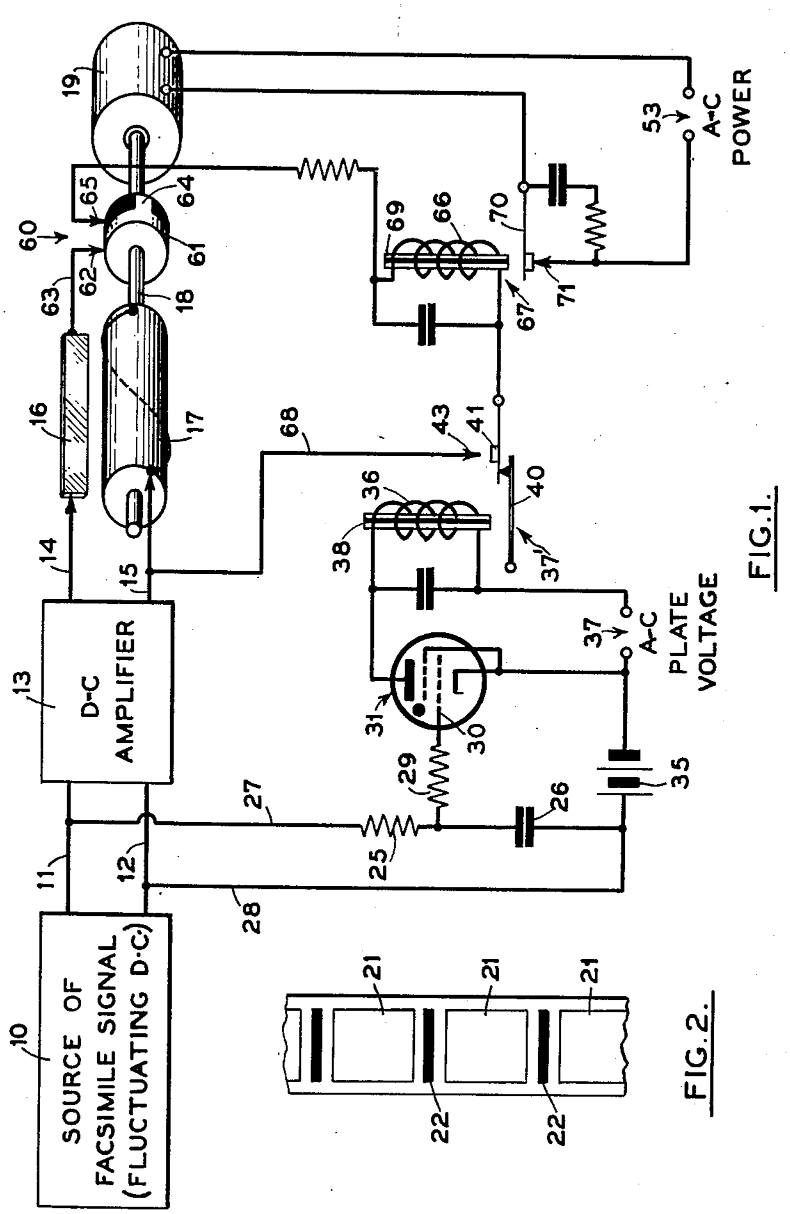
Fig. 1 is a schematic diagram of a presently preferred form of the invention.
Fig. 2 is a representation of recordings on a continuous strip of recording paper illustrating how pages of graphic material are separated by black bars corresponding to the interpage signals.

Referring now in greater detail to the drawings, the output of a source 10 of facsimile signals, which may be a facsimile radio receiver, is applied by wires 11 and 12 to a D.-C. amplifier 13. The output of the amplifier is applied by wires 14 and 15 to linear recording electrode 16 and helical recording electrode 17, respectively. Electro-responsive recording paper passes between the recording electrodes and is marked point-by-point and line-by-line to reproduce the graphic copy scanned at the sending end of the system. Helical electrode 17 is rotated by shaft 18 coupled to synchronous motor 19.

The recording paper (not shown) emerging from between linear and helical electrodes 16, 17 may, as represented in Fig. 2, consist of page portions 21 bearing graphic material, as type, pictures and drawings; the page portions being separated by black bars 22 resulting from the interpage signals received. The bars 22 may contain station identification in reverse printing. The control circuits of the present invention are responsive to the full-strength interpage signals.

A high-impedance R-C delay network consisting of resistor 25 and capacitor 26 is connected by wires 27 and 28 to the output of signal source 10. The output of the delay network is connected through resistor 29 to the control electrode 30 of a thyratron tube 31. Resistors 25 and 29 may be 5 megohms in value, and capacitor 26, 0.05 microfarad. Thyratron switch tube 31 has a bias voltage source 35 in its grid circuit and a relay magnet coil 36 and A.-C. plate voltage source 37 in its plate circuit. In operation, by reason of the delay network in the input circuit of thyratron 31, the thyratron is rendered conductive only when a full-strength marking signal of appreciable duration is received, as for example, an interpage signal. Thyratron 31 is rendered non-conductive (quenched) upon the termination of the interpage signal by reason of its A.-C. plate voltage source 37 which makes the plate negative once during each cycle.

A relay, generally designated 37', includes a core 38 (for coil 36) which acts on a biased armature 40, movable contact 41 responsive to the armature, and cooperating fixed contact 43. Cooperating contacts 41, 43 are normally open.

The portion of the circuit thus far described may be in common with a similar portion of the circuit shown in a copending application of Frank A. Hester, Serial No. 122,963, filed October 22, 1949, on a Facsimile Recorder with Automatic Start-Stop, when it is desired to incorporate both inventions in a single recorder.

A rotary switch generally designated 60 on shaft 18 has a continuous slip ring 61 contacted by a brush 62 which is connected by wire 63 to one of the recording electrodes 15. A contact segment 64 integral with ring 61 is contacted intermittently by brush 65. Brush 65 is connected through coil 66 of phasing relay 67, normally-open contacts 41, 43 and wire 68 to the other recording electrode 17. Phasing relay 67 includes a core 69 which acts on movable contact 70, contact 70 and cooperating fixed contact 71 being disposed in the circuit supplying power from source 53 to motor 19.

It is common practice in helix-type facsimile systems to provide a time space between recorded lines for the transmission of synchronizing pulses. This is accomplished by making the helical electrode 17 with its ends angularly displaced about its axis by an angle of less than 360 degrees. For example, the helical electrode may cooperate with the linear electrode 16 during 330 degrees of rotation of shaft 18 and be ineffective during 30 degrees. Contact segment 64 of switch 60 is disposed on shaft 18 in an angular relationship with helical electrode 17 in such a manner that brush 65 contacts segment 64 during the ineffective 30 degrees of the helical electrode. It may be noted here that segment 64 can cover substantially less than the 30 degree gap in the helical electrode by reason of the fact that the rotor of synchronous motor 19 has a definite limited number of angular locked-in positions determined by its number of poles.

In operation, thyratron 31 is rendered conductive, relay 37', is energized, and armature 40 closes normally-open contacts 41, 43 during receipt of an interpage signal. It is assumed that synchronous motor 19 is operating in synchronism with the scanner at the transmitting end of the system by reason of the A.-C. source 53 being tied in with the power source at the transmitter. However, the motor 19 may be rotating at an angular displacement relative to the transmitter so that the recording is out of phase, i. e., the recording is not centered on the recording sheet. If this is the case, recording voltage will be present across wires 14 and 15 at a time when helical electrode 17 does not make an intersection with linear electrode 16. While the recording current cannot flow through the recording paper between the recording electrodes, it can flow from wire 14 through electrode 16, wire 63, brush 62, slip ring 61, contact segment 64, brush 65, relay coil 66, contacts 41, 43, and wire 68 to wire 15. When this occurs, relay 67 is energized opening normally-closed contacts 70, 71 in the power supply circuit of motor 19. The circuit is momentarily interrupted by a single line of the interpage signal with the result that motor 19 slips back, say one pole. Each succeeding line of the interpage signal causes the motor to slip back, until the circuit is no longer completed through rotary switch 60. The equipment will then be in phase, i. e., the recording will be centered on the recording paper.

Upon the termination of the interpage signal, thyratron 31 is rendered non-conducting, relay 37' is deenergized and normally-open contacts 41, 43 are opened. The phasing circuit is then inoperative until the next full-black signal of substantial duration is received. In this manner, bursts of noise or interference received in the time between interpage signals are precluded from causing the equipment to jump out of phase. To affect the phasing circuit, noise must occur when brush 65 is on segment 64. Noise occurring between two lines of the interpage signal might temporarily upset the phasing procedure but succeeding lines would quickly bring the equipment into proper phase. On the other hand, noise occurring between interpage signals (during page signals) might cause the recorder to run out of phase for the remainder of the page and until the next interpage signal is received. This invention precludes such an unhappy occurrence.

It will be understood the facsimile receiver cannot distinguish the interpage signal from the signal resulting from the scanning of graphic copy including a solid black portion extending across the page. The operation of the apparatus of this invention is not in any way adversely affected by these latter signals. The regularly-occurring interpage signals insure the functioning of the apparatus in the desired manner.

While the invention has been described in some detail by reference to specific circuits shown, it will be understood that this has been done by way of illustration, and that the scope of the invention is not to be limited thereto.

What is claimed is:

1. In a facsimile recorder having its mechanical parts driven by a motor supplied from a source of power, an automatic phasing apparatus comprising: relay and rotary switch circuit means operative responsively to a received facsimile signal to momentarily disconnect said motor from its source until the motor operates in phase, a relay with normally-open contacts in circuit with said means, an electronic switch tube operative to actuate said relay, and an integrating network the input of which is receptive to received facsimile signals and the output of which is applied to the switch tube for the control thereof.

2. An apparatus for maintaining a facsimile recorder in phase with a scanner generating a facsimile signal which sometimes is a solid black signal, comprising, an integrating network receptive to the facsimile signal, a switch tube circuit receptive to the output of the integrating network, a first relay energized by said switch tube circuit when the integrating network is receptive to a solid black signal, a motor, a source of energy for driving said motor, a rotary switch operable by said motor, and a second relay operative when energized to interrupt the source of energy to the motor, said second relay being energizable by the solid black facsimile signal going through said rotary switch and said first relay.

3. An apparatus for maintaining a facsimile recorder in phase with a scanner generating a facsimile signal which sometimes is a solid black signal, comprising, an integrating network receptive to the facsimile signal, a thyratron having a control grid receptive to the output of the integrating network, an output circuit for the thyratron including an A.-C. plate current source and a first relay, the thyratron being conductive and the relay being energized when the integrating network is receptive to a solid black signal, a motor, a source of energy for driving said motor, a rotary switch operable by said motor, a second relay operative when energized to interrupt the source of energy to the motor, and circuit means including the relays and the rotary switch receptive to the facsimile signal, whereby on receipt of a solid black signal the source of energy to the motor is momentarily interrupted until or unless the motor operates in proper phase.

4. An apparatus for maintaining a facsimile recorder in phase with a scanner generating a facsimile signal which sometimes is a solid black signal, comprising, a motor, a source of energy for said motor, a rotary switch operable by said motor, a relay, means for interrupting the energy to said motor, said means being connectable through said rotary switch and relay to the facsimile signal and being responsive thereto, an integrating network receptive to the facsimile signal, a switch tube circuit receptive to the output of the network and operative to close said relay when the integrating network is receptive to a solid black signal.

JOHN W. SMITH.

REFERENCES CITED

The following references are of record in the file of this patent:

UNITED STATES PATENTS

| Number | Name | Date |
|---|---|---|
| 2,230,820 | Young | Feb. 4, 1941 |
| 2,246,284 | Artzt | June 17, 1941 |
| 2,366,415 | Lindsay | Jan. 2, 1945 |
| 2,512,647 | Hester | June 27, 1950 |
| 2,537,610 | Volz | Jan. 9, 1951 |
| 2,540,922 | Wickham | Feb. 6, 1951 |